United States Patent [19]
Mendelsohn et al.

[11] 3,772,064
[45] Nov. 13, 1973

[54] PRESSURE SENSITIVE THERMOSETTING RESINOUS ADHESIVE TAPES

[75] Inventors: Morris A. Mendelsohn; Charles R. Ruffining, both of Pittsburgh, Pa.

[73] Assignee: Westinghouse Electric Corporation, Pittsburgh, Pa.

[22] Filed: July 13, 1971

[21] Appl. No.: 162,045

[52] U.S. Cl. ........ 117/122 P, 117/76 T, 117/122 PB, 117/126 GR, 117/138.8 F, 117/230, 260/40 R, 260/47 C
[51] Int. Cl. .............................................. C09j 7/04
[58] Field of Search .................. 117/122 P, 122 PF, 117/122 PB, 122 PA, 76 A, 68.5, 76 T, 126 GR, 138.8 F, 230; 260/47 C, 40

[56] References Cited
UNITED STATES PATENTS

| | | | |
|---|---|---|---|
| 2,445,553 | 7/1948 | Beavers | 117/122 |
| 3,170,833 | 2/1965 | Noyes | 260/47 |
| 2,765,251 | 10/1956 | Williams | 117/72 X |
| 2,892,747 | 6/1959 | Dye | 161/231 X |
| 2,789,096 | 4/1957 | Bruno et al. | 117/122 |
| 3,378,630 | 4/1968 | Mendelsohn et al. | 117/122 X |
| 3,546,168 | 12/1970 | Allen | 260/47 |

*Primary Examiner*—William D. Martin
*Assistant Examiner*—Bernard D. Pianalto
*Attorney*—F. Shapoe et al.

[57] ABSTRACT

A thermosetting adhesive is made from a saturated highly aromatic polyester resin derived from a low molecular weight dihydric or trihydric polyol, a difunctional aliphatic acid or its corresponding halide or anhydride and a polyfunctional aromatic acid, or its corresponding halide or anhydride, in specified proportions. The adhesive can be applied to fibrous backing to provide a pressure sensitive tape that can be cured to a rigid thermoset state with excellent physical strength and high temperature electrical insulating properties.

2 Claims, 1 Drawing Figure

3,772,064
PATENTED NOV 13 1973
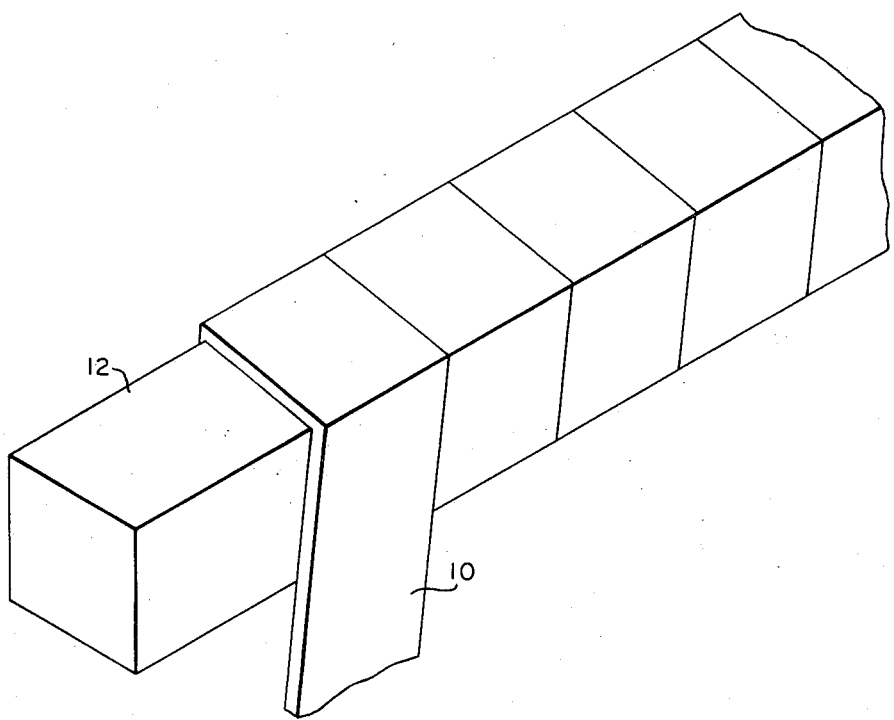

PRESSURE SENSITIVE THERMOSETTING RESINOUS ADHESIVE TAPES

BACKGROUND OF THE INVENTION

This invention relates to thermosetting adhesives and pressure sensitive adhesive tapes, and in particular it concerns electrical insulation tapes which are of exceptional high thermal stability.

Commercially available pressure sensitive tapes are generally of two types. The first employs thermoplastic films, particularly those based on polyvinyl chloride and copolymers of vinyl chloride with other monomers. Vinyl backed adhesive tapes have certain thermal limitations, however, due to the thermoplastic character of the polymer backing and also to the thermal degradation characteristics of vinyl compounds when exposed to elevated temperatures for long periods of time. In general such tapes are unusable at temperatures greater than 100°C.

A second type of commercially available tape for insulation purposes is pressure sensitive thermosetting silicone rubber tape. Although this tape has excellent thermal stability characteristics, it too has many restricting limitations among which are high cost, poor cut-through strength, poor solvent resistance, and it is not safely usable in D.C. equipment.

Mendelsohn and Rogers, in U.S. Pat. No. 3,378,630, solved a variety of these problems by providing an epoxy modified highly, oil extended, polyester based pressure sensitive tape. This tape provided excellent thermal endurance in the 155°C temperature range, resistance to moisture, maintenance of high insulation resistance in the presence of conducting contaminants, and adequate short and long time electric strength for application to low voltage apparatus.

However, this tape when fully cured was flexible and rubber-like at elevated temperatures in part due to high oil extension. While this is advantageous in winding, it can be detrimental in service, especially on a rotating member, subjected to high centrifugal forces, e.g., a large D.C. armature coil. Rubber-like materials by their very nature will creep and undergo a reduction in cross section at a given pressure point. In a D.C. armature this would mean that the insulation on the diamond portion of the coil, under the band and between the coil support, would be considerably compressed, and the dielectric strength of this portion of the coil reduced. In addition, this rubber-like insulation in relieving the stresses imposed by the band, could allow the coil to move, and this motion could produce fatigue at the point where the coil leads are brazed or soldered to the riser. In addition to these problems, there is also a need for insulation that will operate in environments of 180°C temperatures, or higher, and yet be produced from low cost materials.

SUMMARY OF THE INVENTION

Briefly, the above problems are solved with an adhesive composition comprised generally of a saturated highly aromatic polyester resin derived from a low molecular weight dihydric or trihydric polyol, an aliphatic acid, or its corresponding halide or anhydride, and a polyfunctional aromatic acid, or its corresponding halide or anhydride, said aromatic ingredients constituting at least 35 and preferably over 40 weight percent of the adhesive composition. Mineral fillers, in finely divided form, may also be included.

The resulting product is a thermosetting adhesive that can be employed with a supporting member or tape or used as a highly conformable sheet insulation. It has good storage life, cures at a good rate in thick sections, will not creep to the point where perceptible coil motion may occur, is rigid in its cured state without being brittle, is suitable for Class H applications and yet is of modest cost.

BRIEF DESCRIPTION OF THE DRAWING

For a better understanding of the nature of this invention, reference will be made in the specification to the preferred embodiment, exemplary of the invention, shown in the drawing, which is a perspective view of a lead cable insulated with the pressure sensitive adhesive tape of this invention.

DESCRIPTION OF THE PREFERRED EMBODIMENTS

The saturated highly aromatic polyester base material for the present invention is made from a composition that includes at least one low molecular weight polyol such as a dihydric or trihydric aliphatic organic compound, a low molecular weight aliphatic compound such as discarboxylic acid or its corresponding acid halide or anhydride, and at least one low molecular weight aromatic organic acid or its corresponding acid halide or anhydride containing at least two functional groups such as, for example, COOH and OH.

By saturated we mean to indicate the absence of olefinic unsaturation; aromatic unsaturation is not reactive under conditions described herein and is not considered unsaturated. These materials are reacted with one another in ratios that result in some functional groups remaining for later reaction, and the resulting resin is then combined with the other components as shown in detail hereinafter.

The aliphatic polyol used in making the polyester is saturated and contains from two to 10 carbon atoms. Typical of the materials that can be used are, for example, 1,2-propanediol, 1,3-propanediol, 1,2,4-butanetriol, 1,2,3-butanetriol, trimethylolethane, trimethylol propane, ethylene glycol, neopentyl glycol, glycerol and mixtures thereof, with glycerol being preferred. While the amount of this compound used is dependent on the quantity of the other materials present, generally it constitutes about 25 to 65 weight percent of the reactive components employed to make the adhesive.

An aliphatic dicarboxylic acid is preferably used to provide some measure of flexibility in the resulting product, so that it is rigid in its cured state without being brittle. These materials contain from four to 14 carbon atoms. It is understood that the known corresponding acyl halides, chlorides particularly, or anhydrides can be substitutes for the aliphatic dicarboxylic acid. The amount used is critical in providing a nonbrittle yet rigid adhesive, and constitutes about 5 to 35 weight percent of the reactive components employed to make the adhesive. Typical acids that can be used are succinic acid, glutaric acid, 3,3,-dimethylpentanedioic acid, adipic acid, and the like, with adipic acid being preferred.

The polyfunctional aromatic acid component of the adhesive comprises at least one aromatic organic compound that contains two or more carboxyl groups or the corresponding acid halide or anhydride. It may contain mixtures comprising several different aromatic acid components. The polycarboxylic acid derivatives of benzene containing eight to 12 carbon atoms per molecule such as phthalic acid, isophthalic acid, terephthalic acid, trimellitic acid, pyromellitic acid and mixtures thereof may be used. It is understood that the corresponding acid halide, particularly an acid chloride, or anhydride can be substituted for the aromatic acid. The aromatic acid component may contain, in addition to an aromatic polycarboxylic acid or its corresponding acid halide or anhydride, a hydroxy derivative of benzoic acid, containing seven to eight carbon atoms per molecule, such as salicylic acid, p-hydroxy benzoic acid and mixtures thereof. The polyfunctional aromatic compound is preferably a difunctional compound and must constitute between 35 to 65 weight percent of the reactive components employed to make the adhesive. Preferably, the aromatic component constitutes between 40 and 55 weight percent of the reactive components employed to make the adhesive. Preferably, the hydroxy derivative of benzoic acid constitutes between 0 to about 15 weight percent of the reactive components and the polycarboxylic acid derivative of benzene constitutes between about 25 to 55 weight percent of the reactive components employed to make the adhesive.

In addition to the foregoing, various reaction catalysts and the like can be used in the conventional small amounts if desired. Suitably, the polyol, aliphatic and aromatic acids are mixed, while undergoing agitating and nitrogen sparging, or maintenance of an inert atmosphere, at an elevated temperature of about 150° to 250°C. A solvent such as 2-ethoxyethanol, methyl ethyl ketone, xylene or other organic solvent or solvent mixtures, suitably, is added to the saturated, highly aromatic polyester resin to give a 30 to 70 weight percent solids solution.

It is also understood that ester derivatives of the above mentioned aliphatic and aromatic acids could be employed in place of the acids and the term "acid" is meant to include these derivatives as well as said halides and anhydrides. The corresponding polyester would be prepared using an ester interchange reaction. The alcohol that is liberated from the ester derivative is removed from the site of the reaction as the polyol replaces it to form the polyester. This is analogous to the removal of water during an esterification reaction between a carboxylic acid and an alcohol.

Conventional mineral fillers, pigments and the like, as well as mixtures thereof, can also be included to reduce overall expense and to impart additional thermal stability. Iron oxide, magnesium oxide, alumina, silica, carbon black, talc (steatite) and like mineral filler materials are suitable for this purpose and generally are included in amounts, based on the solids content of the resulting mixture, of up to about 60 weight percent. These materials are used in finely divided form, preferably up to about 250 microns average particle size.

Many of the foregoing components are most readily handled as a solution, and accordingly, solvents are thereby introduced. Additional solvent, may be included to facilitate mixing of the various components and subsequent application. The adhesive suitably is prepared by mixing the various components in a ball mill or like device for an extended period.

Adhesives of the present invention are applied to high temperature resistant backing or supporting members or tapes, and the resultant tape is then used in electrical applications. One of the advantages of the invention is the high temperatures at which the adhesive successfully can be used. Consequently, the backing member or tape used must be able to withstand the operating temperatures contemplated. Tape of about 1 to 20 mils in thickness, composed of glass fibers or mixtures of glass fibers and polyethylene terephthalate (Dacron) have been employed successfully. The tape is coated by immersion, painting or like methods followed by heating at moderate temperatures to aid solvent evaporation.

In the attached drawing, the figure is a perspective view of a lead cable insulated with a pressure sensitive adhesive of the invention. In applying the adhesive, the adhesive tape 10 is wound about the cable 12, usually by half-lapping successive turns. The cable 12 may be a lead cable, a copper conductor or other member and may be of circular or rectangular cross-section. A plurality of layers of turns can be employed if desired. Thereafter the adhesive is cured by heating at a temperature of about 130° to 200°C. for 2 to 10 hours or more. One of the most desirable properties of the resulting adhesive is its cured non-brittle rigidity. This cured rigidity will not present winding difficulties, since the system can be wound with the resin being uncured and then cured in subsequent operations.

Depending on the final application, the finished tape can be slit to give rolls varying in widths from several feet to fractions of an inch. The resultant polyester adhesive insulating tape is slightly tacky, pressure sensitive, elastic and flexible, thereby permitting its wrapping around and adherence to a wide variety of objects. On baking the material thermosets to give a hard, impervious insulation suitable for 180°C plus applications. The bands fuse together on heating to give a continuous void-free dielectric barrier. The tape can of course also be used for lower temperature applications.

EXAMPLE 1

A mixture of 92.1 parts (36.9 wt.%) glycerol and 58.4 parts (23.3 wt.%) adipic acid were charged into a reaction vessel. The mixture was heated, agitated, and sparged with nitrogen. Isophthalic acid, 99.6 parts (40.8 wt.%), was added at a fast expedient rate, so that its addition was complete in less than an hour and before the temperature reached 125°C. Within an hour after the addition of isophthalic acid, the temperature was increased to 150°C. The mixture was maintained at 150°–160°C for 2 hours, brought to 175°C over the next hour, and then held at 175°–180°C for 5 hours. The temperature was then increased to 200°C and maintained at 200 ± 5°C until the material reached an acid number of 55–60. At this point 2-ethoxyethanol solvent was added to the resultant highly aromatic polyester resin to give a solution containing 50 ± 1 percent solids.

EXAMPLE 2

One hundred parts of the highly aromatic polyester resinous material of EXAMPLE 1, 20 parts powdered talc filler, 3 parts ferric oxide pigment, and 8 parts 2-ethoxyethanol solvent were ball milled together for 16 hours to give a compounded filled resinous product.

EXAMPLE 3

A highly aromatic polyester resin was prepared from 92.1 parts (31.0 wt.%) glycerol, 13.8 parts (4.7 wt.%) salicylic acid, 132.8 parts (44.6 wt.%) isophthalic acid and 58.4 parts (19.7 wt.%) adipic acid. The glycerol and salicylic acid were stirred together under nitrogen sparging at 190°C for 2 hours. Isophthalic acid was then added and the mixture held at 200°C until clear. At this stage the acid number was 66. The mass was cooled to 135°C and adipic acid was added. The material was then heated to about 170°C and maintained there for about 2 hours, cooled, and dissolved in methyl ethyl ketone solvent to give a solution containing 65–66 percent solids. A 50 percent solution of the resin in methyl ethyl ketone had a viscosity of B–C Gardner-Holdt and the acid number of the resin (solvent-free basis) was approximately 114.

EXAMPLE 4

A mixture consisting of 200 parts of the highly aromatic polyester resin solution described in EXAMPLE 3, 33 ⅓ parts talc and 3 parts ferric oxide was ball milled for 16 hours to give a compounded filled resinous product.

EXAMPLE 5

A highly aromatic polyester was prepared from 92 parts (37.2 wt.%) glycerol, 28 parts (11.4 wt.%) salicyclic acid, 83 parts (33.6 wt.%) isophthalic acid and 44 parts (17.8 wt.%) adipic acid by a method similar to that described in EXAMPLE 2. The final product (solvent-free basis) had an acid number of 70.

EXAMPLE 6

A tape insulation was prepared by dip coating of a Dacron-glass fabric about 0.005 inch thick into the resin composition of EXAMPLE 2. The resin can be applied in one or more dips, two dips being preferred. The solvent was removed by subjecting the coated fabric to a moderate bake of 30–40 minutes at 135°C. The final thickness of the impregnated fabric tape was about 0.008 inches.

Rectangular copper bars measuring 12 × ⅜ × ¾ inches were insulated with a single half-lapped layer of ¾ inch wide tape. The insulation showed excellent conformability to the square corners without gapping. The material was then cured at about 175°C for about 4 hours and was void free. The insulated bars had electric strengths of 8–10 kv (60 cycle, rms straight rise at 0.5 kv/sec).

EXAMPLE 7

A tape was prepared as described in EXAMPLE 6 from the resin composition of EXAMPLE 1. This material differed from that described in EXAMPLE 6 in that the resin component was not compounded with filler.

EXAMPLE 8

A tape was prepared by coating a Dacron-glass fabric with two coats of the compounded resin described in EXAMPLE 4 and then topcoating with the resin described in EXAMPLE 5. The undercoats consist of a filled and very low tack resin, whereas, the topcoat serves as a tackifier.

EXAMPLE 9

A tape was prepared from the resin composition of EXAMPLE 1, as described in EXAMPLE 6, except that the fabric consisted of an all-glass construction.

EXAMPLE 10

The tapes in the above examples were subjected to thermal-humid aging tests. Coil sections, consisting of five rectangular copper conductors, (0.086 × 0.260 × 18 inch) were insulated with two butted wraps of 0.004 inch aromatic polyamide (NOMEX, sold commercially by DuPont) paper tape. Each stack of conductors was then half-lap taped with 0.008 × ¾ inch wide specimens of the tape of this invention.

The insulated coil sections, five or six replicas for each evaluated specimen, were subjected to cycles consisting of aging in air at 220°C and then soaking in water. These samples, along with similarly wrapped commercial resinous adhesive tapes were placed in a forced draft air circulating oven at 220°C and hot cycled about 160 hours. The samples were then cooled and wrapped in water-soaked cloths for about 70 hours. The insulation resistance of the wet bars was then determined at 500 volts D.C.

Failure of the outer adhesive insulating tape by cracking or high weight loss results in moisture penetration of the inner polyamide paper wrapping used in all the wound coil sections. Since the wet inner wrapping does not offer significant insulation resistance, the material will fail the resisitivity test. In addition to thermal endurance the adhesive insulating tape must exhibit an adequate resistance of hydrolysis in order to survive an appreciable number of test cycles.

When all but one of the five or six members of each set of coil sections display an insulation resistance below 1.0 megohm, it is considered that the set has reached the failure point. Test results for some commercial materials and the highly aromatic polyester resins of this invention are shown below in Table 1:

TABLE 1

| Sample | Top Insulating Tape (thickness) | Cycles to Failure |
|---|---|---|
| A. | EXAMPLE 6 (0.008″) | greater than 56* |
| B. | EXAMPLE 7 (0.008″) | greater than 56* |
| C. | EXAMPLE 8 (0.008″) | greater than 56* |
| D. | EXAMPLE 9 (0.008″) | greater than 56* |
| E. | Glass cloth coated with thermoset acrylic resin (0.007″) | 17 |
| F. | Glass cloth coated with diallyl isophthalate resin (0.007″) and top coated with diphenyl oxide insulating varnish | 12 |
| G. | Glass cloth coated with a commercial polyester resin (0.007″) and top coated with diphenyl oxide insulating varnish | 38 |

*Insulation resistances of samples A through D in the wet stage were about $10^5$ to $10^6$ megohms after 56 test cycles, several orders of magnitude over failure point (failure point is less than 1.0 megohm). Also, samples A through D did not have an insulating varnish topcoat.

This experiment indicates that the insulation of this invention will find use in class H applications, that is successfully insulate for at least 10 years at temperature applications on the order of 180°C.

I claim as my invention:

1. A thermosettable pressure-sensitive high temperature adhesive tape, having a thermal endurance over about 180°C, comprising a fibrous supporting member coated on at least one side with a composition comprising
    1. a partially cross-linked highly aromatic saturated polyester consisting essentially of the reaction product of:
        A. about 25 to 65 weight percent of at least one saturated aliphatic organic trihydric polyol containing from two to 10 carbon atoms per molecule, B. about five to 35 weight percent of at least one aliphatic organic difunctional acid containing from four to 14 carbons per molecule, C. about 25 to 55 weight percent of a polycarboxylic acid derivative of benzene aromatic component containing from eight to 12 carbon atoms per molecule, and D. 0 to about 15 weight percent of a hydroxy derivative of benzoic acid aromatic component containing from seven to eight carbon atoms per molecule, and 2. up to about 60 weight percent finely divided mineral filler, based on the solids content of the polyester.

2. The adhesive tape of claim 1 wherein the saturated aliphatic organic compound (A) is a low molecular weight polyol selected from the group consisting of 1,2,4-butanetriol, 1,2,3-butanetriol, trimethylolethane, trimethylol propane, glycerol and mixtures thereof, the aliphatic organic difunctional acid (B) is a dicarboxylic acid selected from the group consisting of succinic acid, glutaric acid, 3,3-dimethylpentanedioic acid, adipic acid and their corresponding acyl halides and anhydrides, the polycarboxylic acid derivative of benzene (C) is an aromatic acid selected from the group consisting of phthalic acid, isophthalic acid, terephthalic acid, trimellitic acid, pyromellitic acid, mixtures thereof and their corresponding acyl halides and anhydrides and the hydroxy derivative of benzoic acid (D) is an aromatic acid selected from the group consisting of salicyclic acid, p-hydroxy benzoic acid, mixtures thereof and their corresponding acyl halides and anhydrides.

* * * * *

UNITED STATES PATENT OFFICE
CERTIFICATE OF CORRECTION

Patent No. 3,772,064        Dated November 13, 1973

Inventor(s) Morris A. Mendelsohn; Charles R. Ruffing

It is certified that error appears in the above-identified patent and that said Letters Patent are hereby corrected as shown below:

Page 1, line 4, cancel "Ruffining" and substitute -- Ruffing --
(Column 1)

Signed and sealed this 16th day of April 1974.

(SEAL)
Attest:

EDWARD M. FLETCHER, JR.
Attesting Officer

C. MARSHALL DANN
Commissioner of Patents